(12) United States Patent
Motzko

(10) Patent No.: US 6,272,443 B1
(45) Date of Patent: Aug. 7, 2001

(54) ACCURATELY MEASURING VEHICLE SPEED BETWEEN FIXED POINTS OF A PATH

(76) Inventor: Friedrich Motzko, Riederwaldsiedlung 25, D-86529 Schrobenhausen (DE)

(*) Notice: Subject to any disclaimer, the term of this patent is extended or adjusted under 35 U.S.C. 154(b) by 0 days.

(21) Appl. No.: 08/771,535

(22) Filed: Dec. 23, 1996

(30) Foreign Application Priority Data

Dec. 28, 1995 (DE) .............................. 195 49 003

(51) Int. Cl.$^7$ .................................................. G01P 3/66
(52) U.S. Cl. ............................................ 702/143; 702/142
(58) Field of Search ........................ 364/571.01, 571.04, 364/571.05, 571.07, 556, 565, 423.098, 436, 438; 340/917, 933, 936, 941; 180/167; 368/89, 107, 113; 702/96, 142, 143, 199

(56) References Cited

U.S. PATENT DOCUMENTS

| | | | |
|---|---|---|---|
| 3,675,195 | * 7/1972 | Iwamoto et al. | 340/941 |
| 4,031,510 | * 6/1977 | King | 340/936 |
| 5,491,475 | * 2/1996 | Rouse et al. | 340/933 |
| 5,617,086 | * 4/1997 | Klashinsky et al. | 340/907 |
| 5,621,314 | * 4/1997 | Beck et al. | 324/179 |
| 5,673,039 | * 9/1997 | Pietzsch et al. | 340/905 |

FOREIGN PATENT DOCUMENTS

| | | |
|---|---|---|
| 30 30 229 | 3/1982 | (DE) . |
| PCT/SE87/00188 | 4/1987 | (SE) . |

* cited by examiner

*Primary Examiner*—John Barlow
*Assistant Examiner*—Craig Steven Miller
(74) *Attorney, Agent, or Firm*—Blank Rome Comisky & McCauley LLP (57) ABSTRACT

The invention concerns a test procedure for measuring the speed of individual objects, in which the test objects (5) are recorded one after another by three sensors (1, 2, 3) arranged on the trajectory. The time that the test object takes to go the distance from the first sensor (1) to the second sensor (2) is determined by means of a time-interval measuring device controlled by the sensors through the test signals (11a, 11b). The test signal outcome (11b) occurring at the second sensor (2) is stored and, during the recording of the test object through the third sensor (3), cross-correlated with the test signal outcome (11c) occurring at this occasion, whereby a corrected value results through the proposed assessment procedure in real time for the first-recorded time test value, which greatly reduces its test error.

14 Claims, 3 Drawing Sheets

ACCURATELY MEASURING VEHICLE SPEED BETWEEN FIXED POINTS OF A PATH

BACKGROUND OF THE INVENTION

The determination of the speed of a test object takes place in the simplest way from the magnitudes to be defined—the path and the time. Either the time the test object needs to move the distance of a certain test stretch or the actual distance that is travelled in a certain time period is measured; only rarely are both magnitudes determined. Because time measurements are easier to carry out than distance measurements, the first of these options is usually preferred, especially when the trajectory of the test object is known in advance. In that case, one succeeds in monitoring the starting and finish points of a test stretch with devices that can control the presence of the test object at these points and with a suitable time-interval measuring instrument.

Although when measuring the speed only, a time measurement is taken, the other magnitude to be defined—the distance travelled—will also contain an error. Time measurements can be carried out today with a precision that well surpasses the accuracy needed here. It is much more difficult to define the test distance precisely enough, i.e, accurately and quickly enough to determine on which side of the starting or finish point of the test stretch the test object can be found.

Superficially viewed, the error in speed can be made as small as desired with a given absolute error of distance and time only if the test distance can be made large enough. This is, however, usually not practical, if only for the reason that the test object normally cannot be observed as long as one wants, and one usually cannot wait any amount of time for the test results.

Furthermore, measuring speed in the way discussed here requires that the test object does not change its speed when travelling the indicated distance or that it even stops after crossing the starting point and waits for a certain time before it continues to the finish point. When the test distance is extended, the probability that such an error will occur increases, and in addition, its consequences for the test result become more significant.

A further difficulty associated with putting the theory into practice results from the fact that several test objects can exist, whereby it is possible that at the beginning of a measurement—i.e., when a test object crosses the starting point of the test stretch—other test objects can be found on the test stretch—in other words, they have not yet crossed the finish point. In that case the measuring procedures for individual test objects can overlap in terms of time, and it is necessary to assign the events of crossing the starting and finish points of the test distance to the individual test objects in a reliable way. Doing so is demanding and fraught with error, and one strives to keep the test distance as short as possible—a circumstance that, in turn, requires the greatest possible accuracy when defining the starting and finish points.

These are conditions that affect the measurement of the speed of vehicles in street traffic. If one does not carry out the measurement at junctions or intersections—and also at parking lots—then the vehicles almost always move in well defined lanes and in one or two well defined directions. Lane changes can occur, but usually only small angular deflections from the normal direction of motion arise so that the errors in measurement that occur as a result of this remain small.

On the other hand, the special need for the shortest possible test distance exists because situations in which vehicles drive at low speeds at small intervals and must stop, unfortunately, occur more and more often. The speed test values, which are delivered by a measuring arrangement with a test distance along the order of several meters, under no circumstances possess any significance in such a situation.

But really high speeds can also occur. In the passing lane of a highway one usually does not drive faster than 200 km/hour. On the other hand, one encounters just as often the so-called stop-and-go traffic that occurs in traffic jams on highways, one reason why an extension of the test distance prevents an exact measurement of high speeds.

There therefore arises a problem of finding detection devices with which the starting and finish points of the shortest possible test distance can be monitored as accurately as possible—which means, in this case, that the two shortest possible sections of the trajectory must be checked for the presence of a vehicle on them. Moreover, the time difference between the actuation of the detection device at the start of the test distance and again at the finish must be determined as accurately as possible. A sufficient condition for this is the possibility of determining the exact time points of the actuation; but this must not be required. Only the time difference is required. That is of decisive significance for the test procedure proposed here.

One possibility of detecting vehicles is represented by the known induction loops embedded into the roadway. Because they are several meters long in the driving direction, a test distance of the short length required here therefore cannot be realized.

A further possibility is offered by radar and microwave measuring systems that emit rays that are reflected by the vehicle. Radar and microwave rays can be much more finely concentrated than an induction-loop detector can be extended; nonetheless, they still do not obtain a detection accuracy sufficient for the size of the test fields that are being aimed at here. The same goes for an ultrasound procedure.

In the case of detection devices on an optical basis, the desired accuracy can be obtained. Known procedures have, nevertheless, specific weaknesses in street traffic. Simple light barriers cannot be used. If one installs them horizontal to the sender on the one side of the traffic lane and the receiver on the other side, several traffic lanes are almost always monitored; in other words, several trajectories are monitored at the same time without there being a possibility of distinguishing between them. In addition, a light barrier used in such a way would only operate accurately if the vehicles possessed a well defined vertical front edge, similar to a ship's bow. In the case of modern passenger vehicles, a wedge shape is, however, preferred. In addition, every vehicle produces certain pitching motions. All of this hinders the accuracy of the detection considerably.

A measuring procedure, in particular for sensors of this type, is described in DE 30 22 345 A1. The document also shows some measures for overcoming the difficulties mentioned: measuring errors can occur when several vehicles in various traffic lanes pass the measuring device at the same time. For this reason, two measurements of the speed are carried out one after the other, and if conflicting values result, the measurement is ignored.

More advantageous would be light barriers that are installed vertically; in that case, individual traffic lanes could be monitored selectively, and well defined horizontal front edges exist in modern motor vehicles. In this case the sender must be attached above the street to the frame of a traffic sign or something similar, and the receiver must be embedded in the road surface, or vice versa. Such demanding installation impairs the use of a detection device, but in spite of this, the really decisive thing is the fact that the light path can be blocked by dirt.

As a remedy, reflection light barriers were suggested in which the sender and receiver are both installed over the roadway. In this case, the sender emits a narrow light beam; and the receiver is lined up with the light spot on the roadway produced by it and reacts to changes in its brightness in connection with the vehicle's lights instead of street lights. This design, however, strongly suffers from the fact that the brightness of the light spot as the vehicle drives in may not necessarily change (enough). Because the diffusely reflected light is very weak, a large amplification with a correspondingly high noise level is essential. Signal changes that do not stand out from this noise sufficiently occur too frequently to be able to designate such a reflection light barrier as reliable.

This problem can be met by installing an optical sensing device instead of a reflection light barrier, which can function both on a trigonometric basis or by measuring the light time delay. A vehicle that has just driven in covers the street to a certain height so that the range test value must change only as long as the light that comes on in connection with the receiver is sufficient for a range measurement. Unfortunately, this, too, cannot always be guaranteed.

Both of the above-mentioned approaches to the solution have, in addition, the disadvantage that only one point of the traffic lane is monitored—traffic lanes on which vehicles (especially narrow ones like, e.g., motorcycles) can simply pass by [unnoticed]. While the transmitted light beam can easily be widened transverse to the driving direction, the representation of the light strip produced by it on the receiver element is difficult and reduces the sensitivity of the detection device considerably.

Linear overrun sensors that are embedded in the road surface transverse to the driving direction and react to the pressure caused by the tires of a vehicle offer an alternative in which many of the above-mentioned problems are avoided. As a consequence, a monitoring area can be created that covers only about 1 cm in the driving direction, but, however, includes the entire width of the traffic lane in the transverse direction, whereby in the case of several traffic lanes, each individual one can be monitored selectively.

The consequence for the measurement of the speed is that small test stretches can be created, whereby the trajectory of the test object may shift considerably—above all longer than it is wide. Problems with it getting dirty hardly ever arise: only heavy snow or layers of ice hinder its sensitivity. Although one must mill a slit in the road surface to install it, the installation is made much more simply than that of an induction loop, particularly for measurements of speed that require several detection devices.

Such linear overrun sensors are, for instance, the known piezo-pressure tubings, which have already been used to measure speed. Recently, however, sensors on the basis of a fiber-optic light guide have become generally known and are also excellently suited to this purpose.

The document WO 87/063 49 A1 describes a measuring arrangement with such linear overrun sensors that is also on a basis of a fiber-optic light guide. It is proposed that two sensors be connected with each other so that a solid interval can be maintained between them, and then that this arrangement be installed transverse to the traffic lane. As a result, the measurement arrangement becomes portable.

One particular difficulty with the use of linear overrun sensors consists in the fact that the signals, which are produced by running over several sensors, are similar qualitatively, but nonetheless usually have different amplitudes, if only because one can only rarely guarantee that the sensors are always carrying equally heavy traffic. So that this idiosyncrasy does not cause errors in measurement, special measures must be taken.

SUMMARY OF THE INVENTION

The procedure introduced here solves the problem of measuring the speed of vehicles with linear overrun sensors, preferably in street traffic, whereby the measurement arrangement can be shorter than the shortest expected center distance in the driving direction; in addition, the test result does not depend on the amplitudes of the signals produced by individual sensors by running over them; and signal processing can take place without using expensive special components on an inexpensive, standard, commercial microprocessor or microcontroller.

According to the present invention, a process and system for measuring the speed of individual test objects within predetermined limits of high accuracy detects the passage of a preselected point on the test object past each of a sequence of at least three sensors on a predetermined trajectory path. The time interval from passage of the preselected point on the test object past the first sensor until passage of that point past the second sensor is measured according to a start-stop timer controlled by signals generated by successive ones of the sensors in response to passage of the test object. The signals trigger the start and stop of the timer when the first one reaches a predetermined level relative to a reference level and the second one reaches a predetermined level relative to the same reference level. The signal generated by the second sensor upon passage of the test object is stored, and is cross-correlated with the signal generated by the third sensor in a calculation that employs a delay time related to the aforementioned time interval by the ratio of the distances between the first and second sensors and the second and third sensors, respectively, wherein the maximum value of the cross-correlation function is applied to varying delay times to correct error in determining speed of the test object from the time interval between signals generated by, and distance between, the second and third sensors.

BRIEF DESCRIPTIONS OF THE DRAWINGS

The above and other aims and advantages of the invention will be better understood from the following detailed description of the best mode presently contemplated for practicing the invention, with reference to a preferred process and system embodiment and the accompanying drawings, in which.

DETAILED DESCRIPTION OF THE PREFERRED PROCESS AND SYSTEM EMBODIMENT

Figure 1:
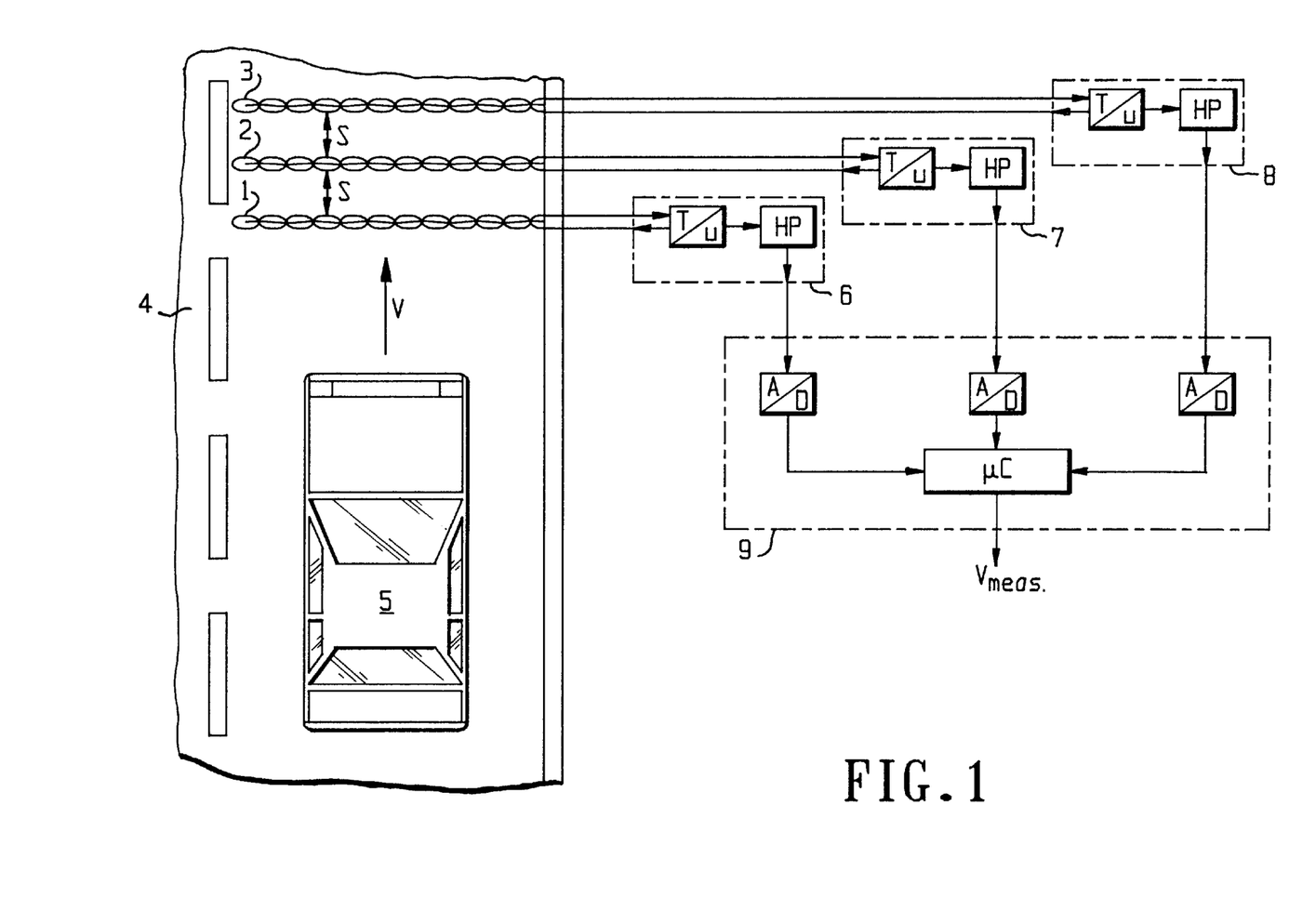
FIG. 1 is a combined schematic and block diagrammatic representation of a measuring system according to the invention.

FIG. 1 shows a diagrammatic representation of the measuring device according to the invention. The procedure requires at least three overrun sensors (1, 2, 3), which are embedded in the road surface (4) of the entire width of the traffic lane transverse to the driving direction. A vehicle (5) that moves on the traffic lane runs over sensor 1 first, and then over sensor 2, and finally over sensor 3, whereby a signal is produced each time. The distance between the individual sensors s in the driving direction is significantly smaller than the center distance of the vehicles so that a tire can never run over sensor 1 before the tire in front of it runs over sensor 3 and has consequently left the monitoring area of the measurement arrangement.

It is not absolutely necessary for the distance between sensor 1 and sensor 2 to be equal to the distance between sensor 2 and sensor 3. In so doing, however, the procedure can be more easily grasped, and an advantage of one length over another length has not been discovered. The three overrun sensors are connected (under certain circumstances by means of pressure-sensitive transmission light guides) to adjusting devices (6, 7, 8), which are not the subject matter of the invention. Their function will, nonetheless, be explained briefly for the sake of better comprehension.

An overrun sensor contains a fiber-optic light guide that reacts to pressure with a reduction of light transmission due to the special construction of the sensor. Logically, the adjusting device contains a light source whose light is connected up in the sensor, and a photo detector, which is lit by the light conducted through the sensor. The photo detector delivers an electrical signal that is proportional to the transmitted light and is processed in the conventional way. Such an arrangement—even if, in practice, its implementation is much more complicated—thus represents a transmission-voltage convertor or a transmission-current convertor (in FIG. 1 understood and drawn in as a T-u convertor).

It is advantageous to connect a high pass to the T-u convertor later (HP in FIG. 1). Although this is not necessary, it is the way that existing adjusting devices are implemented. For the measuring procedure proposed here, this high-pass property is, however, required. In so doing, the "high pass" does not need to correspond strictly to its electro-technical definition, but must, nevertheless, allow for the possibility of assigning the value zero to the signal of a no-load overrun sensor or, alternatively, to indicate the signal outcome at the time it runs over the sensor. This is obtained through simple means by a high pass in the adjusting device.

The electrical signals processed by the adjusting devices (6, 7, 8) are, then, fed to a signal-processing device (9). This device can be implemented most simply, as one sees in the drawings, by means of a microcontroller ($\mu$C) that is provided with a time-interval measuring system (not drawn in, for most are usually internal) and an analogue input for each of at least three signals.

Figure 2:
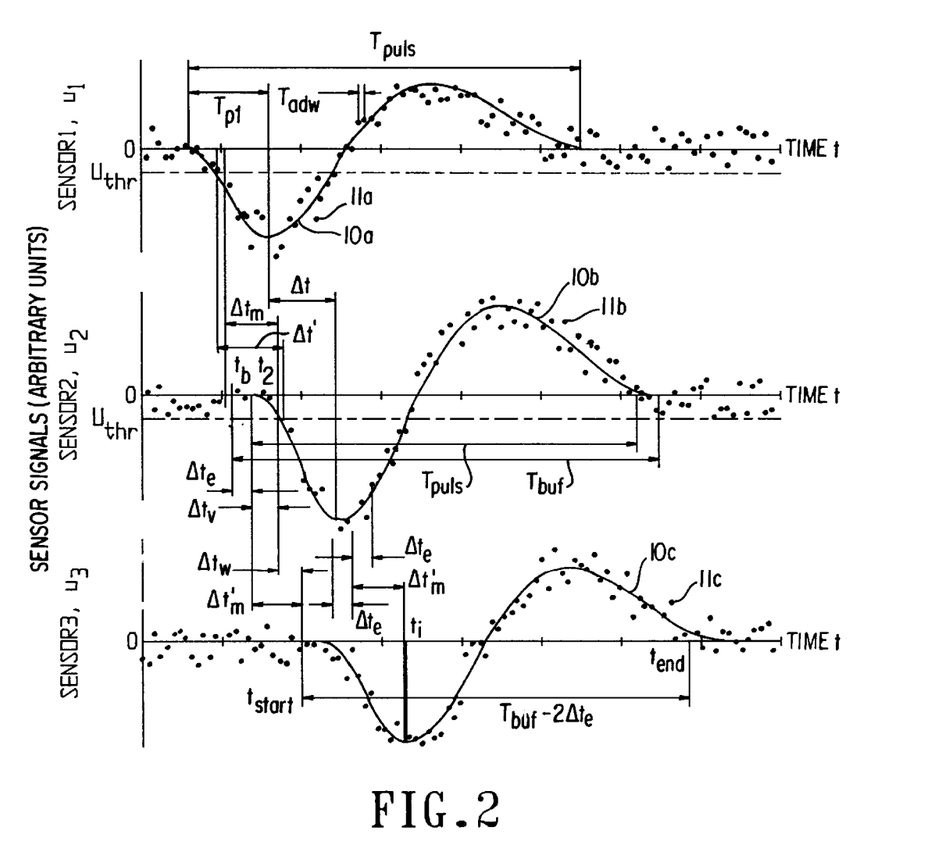
FIG. 2 is a chart showing the analog signals produced by the sensors in response to passage of the test object or vehicle.

FIG. 2 shows the signals that the overrun sensors produce with the adjusting devices, which are connected later, when they are run over by a tire or tires of a vehicle axle and which are to be processed through the procedure according to the invention.

The curves 10a, 10b, and 10c are to be understood as ideal signal outcomes. They can be distinguished, for now, by a time change of the amount $$\Delta t = s/v, \qquad (1)$$

which should be ascertained as accurately as possible in order to determine the unknown speed, v, by means of the known distance, s (cf. FIG. 1). These curves, however, are also distinguished by different amplitudes because it is almost impossible to maintain the sensitivity of the overrun sensors so they are exactly equal.

This difference in the signal amplitudes, which, you might note, already exists in the case of ideal signal outcomes, produces the chief difficulty in determining $\Delta t$ with sufficient accuracy. The reason for this is, ultimately, that the time, $T_{pl}$, which the signal requires to obtain a minimum lies in the order of the time to be measured, $\Delta t$, and cannot be substantially shortened.

If this succeeds, or if the amplitude signals were equal, $\Delta t$ could be determined very easily from the times that the signals fall below a certain threshold value, $u_{thr}$. One would start a time-interval measuring device when, e.g., the signal of sensor 1 fell below the threshold value and would stop it again as soon as the signal of sensor 2 does the same. Such a procedure will be designated henceforth as a "start-stop procedure."

As is evident from FIG. 2, one thus does not, however, measure time $\Delta t$; one instead measures time $\Delta t'$, which can, theoretically, differ from $\Delta t$ by up to $\pm T_{pl}$. But because $\Delta t'$ and $T_{pl}$, can be approximately equal in size, it is easy to see that in such a case an error in measurement that can no longer be deemed tolerable can arise.

If the threshold values could be adjusted to the signal amplitudes, this error could be compensated for, but to do so either the amplitudes must be known in advance or one must first store the signal outcomes, determine the amplitudes, derive threshold values from them, and finally examine the stored signals to see if they have fallen below the threshold value. With such a demanding signal analysis, which can first begin only when the overrun action is already finished, there must be a concern that the next overrun action has already begun during the processing.

A further source of error results from the fact that the signal-processing device (9) can never be fed ideal signal outcomes. The signals will always at least have the defect of being noisy. By using a microcontroller, as shown, there is the additional problem that it does not receive constant signals, but must process individual test points (1a, 11b, 11c) in time intervals $T_{adw}$. A stop-start procedure therefore supplies not time $\Delta t'$—but time $\Delta t_m$, which has an additional error compared to $\Delta t'$.

These difficulties can be overcome through the use of a correlation measuring procedure. To measure the time delays one makes use of the fact that for two signals x(t) and y(t), in which there are alternating quantities, and for which $$x(t) = c \cdot y(t - \Delta t) \qquad (2)$$

holds, the so-called cross correlation function, $$\phi_{xy}(\tau) = \lim_{T \to \infty} \frac{1}{2T} \int_{-T}^{T} x(t) y(t - \tau) dt \qquad (3)$$

reaches a maximum for $\tau = \Delta t$, that is, when both signals are noisy. (In practice, the above equation is not used; approximations are used.)

Speed-measuring procedures based on this concept are known. In, for example, the production of endless material (paper, textiles, etc.) the speed of transport is measured. In connection with this, one observes the transported material with two test sensors suited to it (e.g., photo detectors), which are attached locally in the direction of the movement and are staggered with respect to each another so that both test sensors, which are temporally staggered, deliver basically the same signal. The earlier signal is, then, delayed by time τ and cross correlated with the other signal. The delay time τ is varied until the correlation result reaches a minimum. It then corresponds to the time that the material needs [to move] from the first to the second sensor.

Such a measuring procedure is not suited to the present measuring task because the signal outcomes are, temporally speaking, not prolonged semi-infinitely. They are, instead, nonrecurrent events so that there is no chance at all of varying the delay time. A single cross correlation, however, contains no information whatsoever about the "true" time delay, Δt, between both signals; this information only results from the comparison with the cross correlation that was obtained from τ with other values.

One could then consider storing the signal outcomes in order to be able to mathematically vary the delay, τ, later. An estimate of the effort necessary for this shows, however, that this is a very poor solution: For a speed measurement in street traffic, usually an accuracy of ±3 km/hr. is required in a range of 0–100 km/hr, and an accuracy of ±3% km/hr. is required in a range of 0–250 km/hr. Just to obtain a measurement resolution with these numerical values about 70 cross correlations would have to be calculated. If one chooses, for example, a value of 30 cm for the test distance, the result at 250 km/hr. is a maximum reliable error of 130 μs for Δt. This is, consequently, the upper limit for time $T_{adw}$, among the individual test values. In the case of a speed of 3 km/hr., Δt amounts to 360 ms. That means that, at the very least, 2,770 test values would have to be stored. If one considers the fact that this effort must at least be doubled to obtain an acceptable measuring accuracy, the approach seems to be unacceptable.

A further possibility is pointed out in DE 30 30 229 A1. There, a signal outcome that is produced by passing by one of the first (in this case, passive-optical) sensors over a certain time span is stored analogously. The momentary signal of a second sensor is postponed by means of an analogous shift register with a data bank whose length corresponds to the first signal. At each new measurement a cross correlation is formed analogously between the two signal outcomes. The delay, τ, is, therefore, realized through the passing of time—and exactly time t=s/v passes after the first signal outcome is recorded [for the result of the cross correlation to be a maximum].

Unfortunately, this procedure cannot be used with one of today's standard microcontrollers for a measurement arrangement in accordance with FIG. 1 without encountering problems. The sufficiently accurate calculation of a cross correlation requires the calculation of at least 50 test value pairs. For the purposes intended here the measurement frequency may not, however, be chosen to be smaller than approximately 10 kHz. Because a cross correlation must be calculated for each measurement, most of the inexpensive microcontrollers would be overburdened in this case. The use of a special correlator must, however, be avoided.

One succeeds by using a digital correlation procedure for the simple and yet accurate measurement of the delay between the nonrecurrent events if it is combined with the start-stop procedure. The basic idea is that a start-stop procedure can supply an approximate value for Δt (i.e., $Δt_m$ in FIG. 2), with whose help the number of the cross correlations to be calculated can be drastically reduced. The other idea behind this is to use the correlation procedure for the correction of defective test values, $Δt_m$, rather than for the direct determination of Δt. As is shown, a measuring procedure with a high accuracy and other favorable properties results from this.

The signals of the measurement arrangement in accordance with FIG. 1, as represented in FIG. 2, are processed in the following way.

In the resting state between the individual overrun events, only the signals of sensors 1 and 3 are monitored. Because a vehicle cannot not "jump over" them, it is reliable and advantageous to save the computing power that would be necessary for monitoring sensor 2. The recording of the test values takes place in constant time intervals $T_{adw}$.

The measurement of the speed begins as soon as one of these two signals falls below the threshold value $u_{thr}$. In that case one should assume that the overrun event takes place in the direction shown in FIG. 1. The procedure works just as well in the opposite direction—but the signals from sensor 1 and sensor 3 are exchanged in processing.

As soon as the signal of sensor 1, $u_1$, falls below the threshold value at time $t_1$, a time measurement begins, and sensor 2 instead of sensor 1 is monitored. The test values of the signal $u_2$ (11b) are then stored, i.e., in a ring buffer whose size is calculated so that it can take on obtained values easily during time $T_{puls}$. It is advantageous in this case to plan for somewhat over $(T_{puls}+T_{pl})/T_{adw}$ storage locations. $T_{buf}$ is the number of these storage locations, $n_{buf}$, divided by the cycle time, $T_{adw}$.

If $u_2$ also falls below the threshold value $u_{thr}$ at time $t_2$, the time $Δt_m=t_2-t_1$ that has expired since $u_1$ has fallen below the threshold value is stored. Due to the fixed measurement rate it must be a whole number multiple of $T_{adw}$; it is therefore represented by a number $n_m=Δt_m/T_{adw}$ of the test values recorded since then.

The storage locations on which the actual test value of $u_2$ at time $t_2$ was inscribed is $i_2$. The fall of the (ideal) signal began a short time before this. Then, a storage location, $i_b$, is marked, from which one can assume that it was inscribed just before this signal fall at time $t_b$. In order to determine it, a constant number $n_v$, corresponding to time $Δt_v$ is subtracted from $i_2$. Because it is a matter of a ring buffer around the storage area, $i_b$ is calculated as $$i_b=(i_2+n_{buf}-n_v) \bmod n_{buf} \qquad (4)$$

on the condition that the storage index lies in the range of 0 to $n_{buf}$.

In the same way, a second storage location, $i_e$, is marked; according to its inscription, the storage of signal $u_2$, which constantly continues to be carried out during the next step in processing, is to end. It has the index $$i_e=(i_b+n_{buf}-n_e-1) \bmod n_{buf} \qquad (5)$$

The constant number $n_e$ corresponds to a time $t_e$, which, in turn, corresponds to the maximum possible correction of the error of measurement for Δt. As already suggested, the signal $u_2$ will continue to be stored during the next measurement cycle and checked each time to see whether the test value is inscribed in the storage location $i_e$. If it is, storage is dropped in the future; otherwise the test values after the time $t_2-Δt_v-Δt_e$ would be overwritten. After this point in time, sensor 1 can be monitored again so that the measurement availability is restored again.

By using the time $Δt_m$, which has already been determined, we can now estimate when the fall of sensor 3's signal, $u_3$, can be expected. A waiting period $Δt_w$ follows in which nothing more occurs than the storage of the test points just described. This is $$Δt_w=Δt'_m-Δt_v \qquad (6)$$

whereby the following holds:

$$Δt'_m=Δt_m+c_j·Δt_{adw} \qquad (7)$$

The meaning of $c_j$ will become clear later; now the value is zero so that $\Delta t'_m$ equals $\Delta t_m$. The basic idea behind this is simple to understand: if sensor 2's signal is delayed by time $\Delta t_m$ with respect to that of sensor 1, then sensor 3's signal should display the same delay with respect to sensor 2's signal be cause both distances (s) are the same length. That, of course, will not be exactly the case because $\Delta t_m$, is the time between the fall in the threshold values of signals $u_1$ and $u_2$ instead of the sought after true signal delay, $\Delta t$; but $\Delta t_m$, represents the best approximation to it.

After time $\Delta t_w$ expires, the special correlation procedure described below is applied to the signals $u_2$ and $U_3$.

The situation that was brought about by the past procedural steps is the following. If $\Delta t'_m$ were equal to $\Delta t$, the result would be the expression $$F(i_\Delta) = \sum_{k=0}^{n_{buf}-2i_\Delta-1} u_{3,k} \cdot u_{2,(i_b+i_\Delta+k+n_{buf}) \bmod n_{buf}} \quad (8)$$

where $i_\Delta=0$ is a maximum. The $u_{3,k}$ are the $n_{buf}$-$i_\epsilon$ values of the signals of sensor 3 measured from now on, while the $u_2$, ... are the values of the signals from sensor 2 stored from $t_b$ on.

If, however, $\Delta t'_m$ is different from $\Delta t$, as is expected, then a maximum value for $i_\Delta \ne 0$ results in the same way. The value of $i_\Delta$, for the case here, is $i_{\Delta, \max}$.

Then the following holds:

$$\Delta t = \Delta t'_m - i_{\Delta, \max} \cdot \Delta t_{adv}(\pm t_{adw}) \quad (9)$$

The determination of the overrun speed from $\Delta t$ should not—on account of the prior art—be understood as being subject matter of the invention. The expert would not calculate it with the equation $v=-s/\Delta t$, but would instead infer the values for the speed from a storage table with the indexes $n_m+i_{\Delta, \max}$ to avoid the division.

One determines $i_{\Delta, \max}$ by calculating equation 8 for all values of $i_\Delta$ in the interval $[-i_\epsilon, +i_\epsilon]$. The effort needed for this is not great, for $\Delta t$ cannot vary very much from $\Delta t'_m$. Consequently, $i_{66}$ cannot be particularly large, and one can likewise choose $i_{68}$ to be small. ($i_\epsilon$ must be chosen to be so small so that $\Delta t_\epsilon$ remains, at any rate, smaller than $\Delta t'_m$; otherwise there will be an attempt to apply equation 8 to values of $u_2$ that were never measured. This should be noted during the dimensioning of the test distance, s.)

Because in the future $i_{66}$ only appears in the index of $u_2$, it is in principle unnecessary to store the test values of $u_3$. If the microcontroller used is fast enough—which is the case when it is provided with a hard-wired multiplication—then, as soon as a new value for $u_3$ is available, all of the terms $u_{3,k} \cdot u_2, \ldots$ can be calculated for all values of $i_\Delta$ and added to the corresponding sums that had already been added up. The value $u_{3,k}$ will never again be used.

In addition, the momentary maximum and minimum of the sums $F(i_\Delta)$ can be determined at the same time. From the maximum value a tentative test result can be derived (even while sensor 3 is being rolled over!) that becomes more and more accurate as the overrun action progresses. The minimum can be deduced after all the sums are updated. The maximum value remains a maximum; no value is negative; but an overrun that would otherwise occur very quickly is effectively avoided.

The operations to be carried out for each new test value $u_{3,k}$ can, then, be summed up as follows.

$$F'_k = F_{k-1}(i_\Delta) + u_{3,k} \cdot u_{2,(i_b+i_\Delta+k+n_{buf}) \bmod n_{buf}} \quad (10)$$

$$i_{\Delta, \max} = \begin{cases} -i_\epsilon & \text{if } i_\Delta = -i_\epsilon, \text{ otherwise} \\ i_\Delta & \text{if } F'_k(i_\Delta) > F'_k(i_{\Delta, \max}) \\ i_{\Delta, \max} & \text{otherwise} \end{cases} \quad \text{for } i_\Delta = -i_\epsilon,$$

$$i_{\Delta, \min} = \begin{cases} -i_\epsilon & \text{if } i_\Delta = -i_\epsilon, \text{ otherwise} \\ i_\Delta & \text{if } F'_k(i_\Delta) < F'_k(i_{\Delta, \min}) \\ i_{\Delta, \min} & \text{otherwise.} \end{cases} \quad -i_\epsilon+1, \ldots i_\epsilon$$

$$F_k(i_\Delta) = F'_k(i_\Delta) - F'_k(i_{\Delta, \min}) \quad \text{for } i_\Delta = -i_\epsilon, -i_\epsilon+1, \ldots i_\epsilon$$

So that equation 9 is correct, the relation $$|\Delta t - \Delta t'_m| \le i_\epsilon \cdot \Delta t_{adw} \quad (11)$$

must hold because for $|i_\Delta| > i_\epsilon$, the index $(i_b+i_\Delta+k+n_{buf}) \bmod n_{buf}$ from equation 8 would, under certain circumstances, refer to the wrong stored test values, and thus the calculation of equation 8 for such values of $i_\Delta$ drops out as a matter of common sense.

This requirement does not, however, represent any serious limitation of the procedure, for if, for instance, the equation $\Delta t > \Delta t'_m + i_\epsilon \cdot t_{adw}$ really holds, then $F(i_\Delta)$ for $i_\Delta = +i_\epsilon$ will be larger than it is for all other values in the interval $[-i_\epsilon, +i_\epsilon]$. The value for $\Delta t$ is, at any rate, improved compared to that of $\Delta t'_m$.

Moreover, from the value of $i_\Delta$ one can infer how much and, above all, in which direction the approximate value, $\Delta t'_m$, deviates from $\Delta t$. This is significant because this deviation is very probably systematic or displays a systematic segment caused by a systematic difference between the sensitivities of sensor 1 and 2.

Such a systematic segment can, nevertheless, be compensated for. In this case the significance of the parameter $c_j$ in equation 7 becomes clear. One uses as an approximate value for $\Delta t$ not the value $\Delta t_m$ determined with the start-stop procedure, but a value, $\Delta t_m$, that is corrected by an amount $c_j \cdot t_{adw}$. The value of $c_j$ is corrected after each speed measurement is concluded, e.g., through the operation $$c_{j+1} = \begin{cases} c_j+1 & \text{if } i_\Delta < -i_\epsilon/2 \quad (\Delta t'_m \text{ is too short}) \\ c_j-1 & \text{if } i_\Delta > -i_\epsilon/2 \quad (\Delta t'_m \text{ is too long}) \\ c_j & \text{otherwise,} \end{cases} \quad (12)$$

whereby j is to represent the running number of speed measurements—a parameter that serves the clean mathematical formulation only and does not need to be supplied.

Equation 12, of course, is not to be considered a strict directive; still, this operation has proven itself and can serve as the starting point for further optimization.

Through the adjustment of parameter $c_j$, the procedure becomes, in certain respects,"capable of learning." Without it, $i_\epsilon \ge T_{pl}/\Delta t_{adw}$ would have to be chosen so that the condition, equation 11, is certain to be fulfilled. If, then, the deviation of the approximate value of $\Delta t'_m$ from $\Delta t$ were systematic to a great extent, the values of $i_{\Delta, \max}$ that are determined would be limited to a partial range of the interval $[-i_\epsilon, +i_\epsilon]$; all other values of $i_\Delta$ would be processed in vain each time.

The adjustment of $c_j$; allows one to choose $i_\epsilon$ so small that the interval only corresponds to the maximum random error in measurement that occurs during the measurement through the start-stop procedure instead of corresponding to the total error. The systematic section that the total error, in addition, possesses should not change much from measurement to measurement and is determined by this procedure in a few measurements and then averaged out. Fluctuations of the sensor's sensitivity, which are sure to occur at some time, lead only to a slow change in $c_j$ and do not influence the measurement.

The procedure according to the invention, thus, possesses the following advantageous properties:

gapless, selective monitoring of individual traffic lanes

The determination of the driving direction takes place without any additional measures.

Right at the beginning of the overrun of the middle sensor, a first approximate value for the speed can be determined; for assessment devices connected later this could be very useful under certain circumstances (early warning).

While the third sensor is being overrun, improved corrections of the first approximate values are constantly available.

Right after the overrun of the middle sensor ends, full measuring availability is again restored.

After the overrun of the third sensor has ended, the measuring procedure is completed; absolutely no further processing of the test data is necessary.

Through the above-mentioned properties an extraordinarily high functional reliability results.

The realization of the procedure is made much easier by the following properties.

The test distance (s and 2s) can be adjusted easily to the expected speed—i.e., short test stretches to reduce the influence of changes in speed at low speeds and large test stretches for more exact measurements at high speeds.

The monitored area (the stretch 2s) can also be chosen to be shorter than each occurring center distance for high speeds so that when two overrun actions overlap, they must not be processed simultaneously.

At no time is the monitoring of more than two overrun sensors through the signal-processing device necessary; this negligible effort makes high measuring rates possible e and therefore l leads to a high measurement accuracy.

In the signal-processing device, a storage place for a single overrun operation by means of a single sensor is foreseen.

The speed to be measured has no influence on the mentioned storage need.

The simplicity of the procedure and the negligible expense for hardware lead to a very inexpensive solution both with respect to development and product.

To illustrate the effects obtained by the procedure, FIG. 3 illustrates the results of a computer simulation of one thousand overruns. In it the described assessment procedure was applied to three curves, as represented in FIG. 2, whereby the amplitudes and the overrun speeds, i.e., the time shift between the curves, was varied in the most realistic way possible.

Figure 3A:
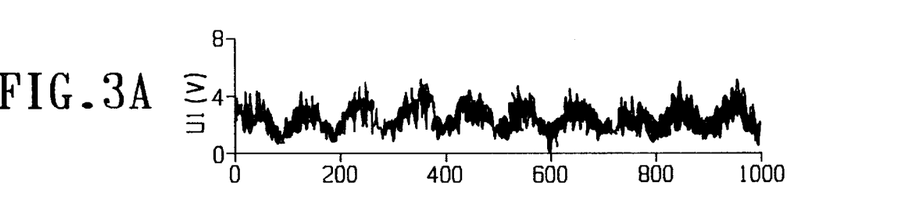
FIGS. 3A–H are charts illustrating computer simulations of multiple sensor-detected passes of the test object or vehicle.
Figure 3B:
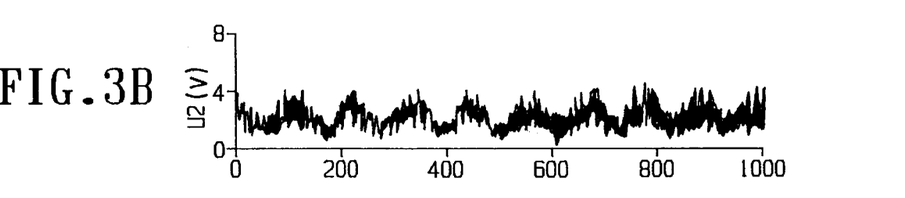
Figure 3C:
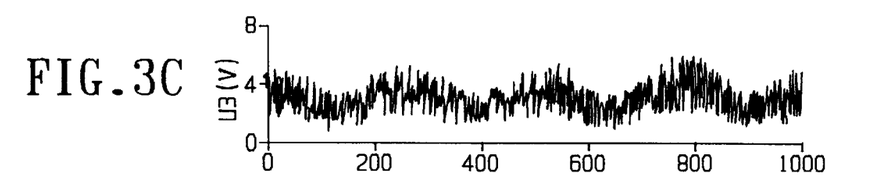
Figure 3D:
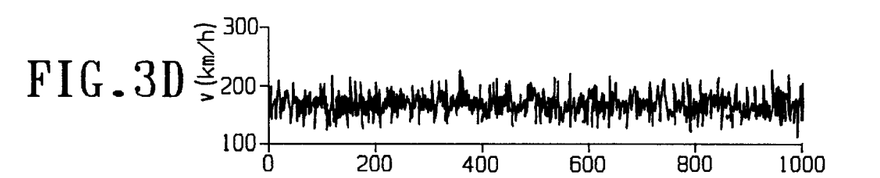

In this connection, a measuring construction was assumed in which the distance s between the sensors was 30 cm. The time, $T_{puls}$, was accepted to 20 ms; the cycle time, $\Delta t_{adw}$, to 70 µs. Diagrams A, B, C in FIG. 3 show the amplitudes—more precisely, they show the negative ordinates of the minimums of each ideal curve for the individual sensors. They possess a quasi-periodic component for simulating drift trends with the sensor sensitivity and, in addition, a random component for simulation of various vehicle weights and similar unforeseeable influences. (These were produced by a random generator; in this connection similar frequencies were produced by sensor 1 and sensor 2.) In addition, a random noise with an amplitude of 200 mV was superimposed on the curves.

Diagram D in FIG. 3 shows the assumed overrun speeds. They have a normal distribution with an average (expected) value of 175 km/hr. and a standard deviation of 50 km/hr.; they should, thus, correspond approximately to the speed distribution on the passing lane of a highway in the case of an extremely sporty driving style.

Figure 3E:
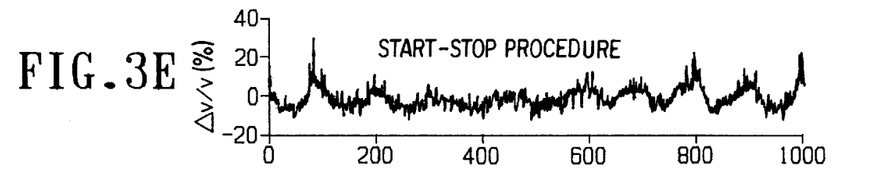

In diagram E the relative error that results when time $\Delta t_m$ is considered when determining the speed has been drawn in. It corresponds to the error of a pure start-stop procedure in which a calculation is made with the same test stretch s. One recognizes that this error displays a systematic section that is related to the signal amplitudes of sensors 1 and 2 that are represented in diagrams A and B.

Figure 3F:
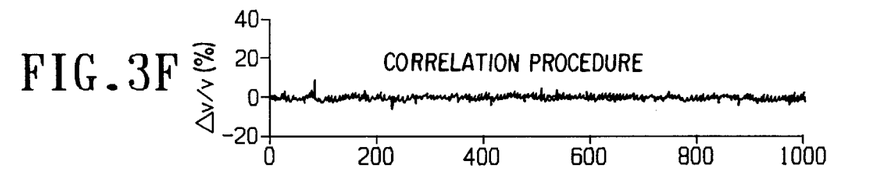

Diagram F shows, in contrast, the relative error in measurement when applying signal processing according to the invention. A systematic section cannot be identified in this case; and, in addition, the random section is also clearly smaller.

Figure 3G:
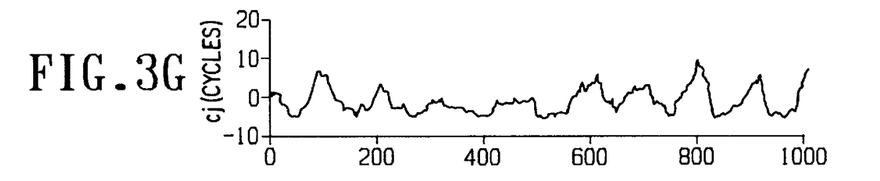

Diagram G shows parameter $c_j$, which results in the course of the simulation calculation in accordance with equation 12. It is obviously correlated with the error in measurement of the start-stop procedure in diagram E. One can conclude from it that the systematic section of the error in measurement was, in fact, eliminated by the adjustment of $c_j$.

Figure 3H:
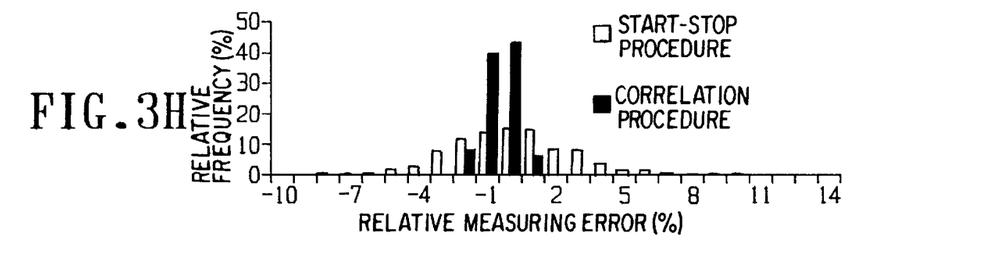

In diagram H the statistics for the errors in measurement shown in diagrams E and F are represented. The difference between the procedure gives the impression of being less impressive than the comparison of diagram E with F; that is based on the fact that in this case what are emphasized are the distribution of the smaller errors in measurement that cannot disqualify a test procedure as can the appearance of extremely large errors that can lead to unbelievable events— even if such large errors are quite rare. A comparison of the abscissa in diagram H with the ordinates in diagrams E and F shows that the complete range of error that results without applying the procedure according to the invention is not represented in diagram H.

But one likewise realizes that the signal-processing procedure according to the invention—whose true strength obviously lies in avoiding extremely large errors in measurement—also considerably improves the properties of the measurement arrangement according to the invention with all its great advantages in the range of the smaller errors.

What is claimed:

1. A process for accurately measuring the speed of individual test objects that move on a known trajectory, comprising the steps of:

detecting passage of a selected point on a test object moving with said trajectory past at least three sensors spaced apart by predetermined distances in sequence along the trajectory path, by generating an analog signal upon passage of said selected point past each sensor;

determining the time interval between passage of said selected point on the test object past the first and second sensors in said sequence by measuring the difference between the points in time at which the magnitude of the signals successively generated by the first and second sensor differs from a reference level by a predetermined amount;

storing the signal generated when the selected point of the test object passes said second sensor;

calculating the value of the cross-correlation function between the signal generated when the selected point of the test object passes the last sensor in said sequence and said stored signal, and calculating further values of said cross-correlation function while varying a delay time which was recorded upon passage of the selected point of the test object past the second sensor and which is related to said time interval according to the ratio of the distances between the first and second sensors and the second and third sensors, respectively;

determining the maximum value of the cross-correlation function, and using said maximum value to correct said delay time to obtain an accurate measure of the time taken by the test object to traverse the distance between the second and third sensors, and determining speed of the test object therefrom and from the known value of that distance.

2. The process of claim 1, wherein the predetermined distances between all pairs of successive sensors in said sequence are equal.

3. The process of claim 1, wherein the distance between the first and last sensors in said sequence is less than the distance between said selected points on successive test objects.

4. The process of claim 1, including determining from the time interval between passage of said selected point on the test object past the first and second sensors and the predetermined distance between the first and second sensors in said sequence, a first approximation of the speed of the test object.

5. The process of claim 1, wherein the number of said sensors is three.

6. The process of claim 5, wherein the test objects are vehicles whose trajectory is determined by a roadway on which the vehicles travel.

7. The process of claim 6, wherein said sensors are pressure sensitive fiber-optic guides embedded in spaced-apart relation in the surface of said roadway in a direction transverse to the normal direction of traffic on the roadway.

8. A system for accurately monitoring the speed of each vehicle traversing a roadbed in which linear overrun sensors are embedded transverse to a customary direction of movement of vehicles on the roadbed to generate respective analog signals in response to vehicle pressure as each tire runs over a sensor in its path, comprising:

at least three linear overrun sensors spaced apart by predetermined distances in sequence in a traffic lane of the roadbed, wherein said predetermined distances are set so that the distance between the first and last sensors in the sequence is less than the longitudinal distance between center points of the front and rear tires of the smallest in a class of vehicles that use the roadbed, so that the front tire of each vehicle in said class moving in said direction on the roadbed always will have run over the last sensor before the rear tire thereof runs over the first sensor; and means responsive to the analog signals generated by the sensors as a vehicle runs over them in said sequence upon passage along said roadbed, for determining speed of the vehicle from knowledge of said predetermined distances and by measuring the time interval between successive ones of the signals from a point that each respective signal reaches a predetermined threshold value as respective delay times related to each other according to the ratio of the respective distances between successive pairs of sensors in said sequence, including:

means for calculating maximum cross-correlation between signals at said point from the last and next-to-last sensors in said sequence and for correcting error in delay time therebetween relative to the delay time between successive signals of a preceding pair of successive sensors in said sequence, to determine vehicle speed within predetermined limits of accuracy.

9. The system of claim 8, wherein the distances between pairs of successive sensors in said sequence are equal.

10. The system of claim 8, wherein said sensors are pressure-sensitive optical transmission guides.

11. The system of claim 8, wherein the number of said sensors is three.

12. The system of claim 11, wherein said means for determining speed of the vehicle provides a first approximation of vehicle speed from distance between the first and second sensors in said sequence and the delay time between the signals generated by said first and second sensors.

13. The system of claim 11, wherein said means for determining speed of the vehicle further includes means for storing the signal generated by the second sensor for cross-correlation with the signal generated by the last sensor in the sequence.

14. A system for accurately measuring the speed of individual test objects that move on a known trajectory, comprising:

sensor means for detecting passage of a selected point on a test object moving with said trajectory past at least three spaced apart locations in series along the trajectory path, by generating an analog signal upon passage of said selected point past each said location;

means for determining the time interval between passage of said selected point on the test object past the first and second locations in said series by measuring the difference between the points in time at which the magnitude of the signals successively generated by the sensor means at said first and second locations differs from a reference level by a predetermined amount;

means for storing the signal generated when the selected point of the test object passes said second location;

means for calculating the value of the cross-correlation function between the signal generated when the selected point of the test object passes the last location in said series and said stored signal, and calculating further values of said cross-correlation function while varying a delay time which was recorded upon passage of the selected point of the test object past the second location in the series and which is related to said time interval according to the ratio of the distances between the first and second locations and the second and third locations, respectively; and means for determining the maximum value of the cross-correlation function to correct said delay time to obtain an accurate measure of the time taken by the test object to traverse the distance between the second and third locations, and determining speed of the test object therefrom and from the known value of that distance.

* * * * *